Figure 1:
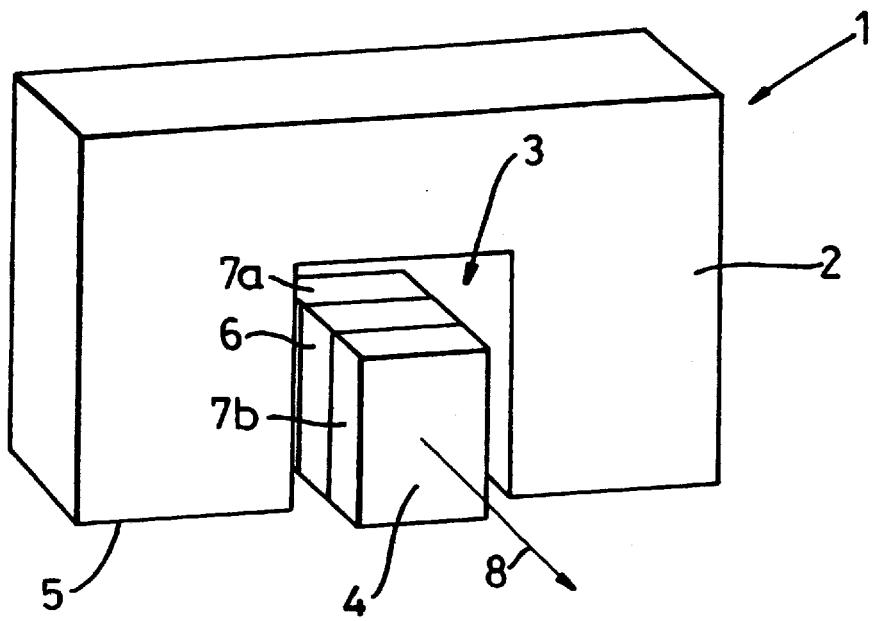

United States Patent
Park

[11] Patent Number: 6,055,102
[45] Date of Patent: Apr. 25, 2000

[54] OPTICAL ISOLATOR HAVING SURFACE MOUNTABLE OPEN CORE

[75] Inventor: Christopher Anthony Park, Bacton, United Kingdom

[73] Assignee: Hewlett-Packard Company, Palo Alto, Calif.

[21] Appl. No.: 09/155,265

[22] PCT Filed: Apr. 7, 1997

[86] PCT No.: PCT/GB97/00967

§ 371 Date: Sep. 24, 1998

§ 102(e) Date: Sep. 24, 1998

[87] PCT Pub. No.: WO97/44700

PCT Pub. Date: Nov. 27, 1997

[30] Foreign Application Priority Data

May 21, 1996 [GB] United Kingdom .................. 9610621

[51] Int. Cl.[7] .............................. G02B 5/30; H01F 1/00; H01F 3/00
[52] U.S. Cl. ................... 359/484; 359/495; 359/500; 372/703; 385/11; 335/219; 335/297
[58] Field of Search ................... 359/484, 280, 359/281, 282, 283, 284, 494, 495, 500; 372/703; 385/11; 335/219, 297, 302, 304

[56] References Cited

U.S. PATENT DOCUMENTS

| | | | |
|---|---|---|---|
| 2,551,947 | 5/1951 | Hoff | 335/302 |
| 3,142,026 | 7/1964 | Chen | 335/302 |
| 4,835,506 | 5/1989 | Leupold | 335/306 |
| 5,239,607 | 8/1993 | da Silva et al. | 385/122 |
| 5,245,471 | 9/1993 | Iwatsuka et al. | 359/494 |
| 5,309,275 | 5/1994 | Nishimura et al. | 385/11 |
| 5,452,122 | 9/1995 | Tsuneda et al. | 359/281 |
| 5,715,080 | 2/1998 | Scerbak | 359/283 |
| 5,757,538 | 5/1998 | Siroki | 359/484 |
| 5,867,314 | 2/1999 | Ota et al. | 359/484 |

FOREIGN PATENT DOCUMENTS

| | | | |
|---|---|---|---|
| 364 968 | 4/1990 | European Pat. Off. . | |
| 640 853 | 3/1995 | European Pat. Off. . | |
| 59165020 | 9/1984 | Japan . | |
| 0142525 | 6/1989 | Japan | 372/703 |
| 5165000 | 6/1993 | Japan . | |

OTHER PUBLICATIONS

"10 Gb/s Strained MQW DFB–LD Transmitter Module and Superlattice APD Receiver Module Using GaAs MESFET IC's", *Journal of Lightwave Technology*, vol. 12, No. 2, Feb. 1994, pp. 332–342.

*Primary Examiner*—Cassandra Spyrou
*Assistant Examiner*—John Juba, Jr.

[57] ABSTRACT

An optical isolator (1) includes an isolator element (4) having an optical axis and a Faraday rotator (6) and at least one polarizer (7a, 7b) and a magnet (2). The magnet (2) is an open-core magnet shaped so that when placed on a substantially planar surface an orifice (3) is defined by the magnet (2) and the substantially planar surface. The isolator element (4) is located within the orifice so that the optical axis passes through the orifice. Such an isolator is well adapted for use in semiconductor laser modules.

19 Claims, 2 Drawing Sheets

OPTICAL ISOLATOR HAVING SURFACE MOUNTABLE OPEN CORE

The present invention relates to an optical isolator, and to optical devices employing optical isolators, in particular semiconductor laser modules.

An optical isolator permits the passage of light in one direction through the isolator, but prevents (or at least substantially attenuates) the passage of light in the opposite direction through the isolator. To achieve such non-reciprocal operation an optical isolator must comprise a component which behaves differently, dependent on the direction in which the light passes through it. This component is generally a Faraday rotator. A Faraday rotator comprises a material, typically a crystalline material, which is capable of rotating the plane of polarization of light passing through it in response to the application of an external magnetic field. The direction of rotation of the plane of polarization is dependent on the direction of passage of the light through the Faraday rotator, relative to the direction of the applied external magnetic field. The Faraday rotator is combined with one, or more, usually two, polarizers or birefringent walk off crystals, in order to form an isolator. The rotation of the plane of polarization provided by the Faraday rotator in one direction allows light to pass through both polarizers, whereas in the opposite direction the plane of polarization is rotated so that the passage of the light through the isolator is blocked by the polarizer.

Optical isolators find particular application in optical communications systems, especially for use with semiconductor lasers. As the transmission rates used in optical communications systems have increased, for example to several Gbits per second, the performance required of lasers used in such systems has also increased. It is well known that light reflected back from some part of an optical communications system will adversely affect the operation of such a high performance laser, for example leading to fluctuations in the spectrum, line width, or intrinsic noise of the laser. Optical isolators are utilised to protect such high performance semiconductor lasers from these reflections, and are increasingly being used not just in systems for research purposes, but in systems which are deployed for commercial use. To prevent isolators from adding an excessive additional cost to laser transmitters, isolators must be miniaturized, easily aligned to a laser, and of low cost.

A number of miniaturized optical isolators are known. WO 93/20465 discloses a laminated isolator element which is disposed within an optical fiber feedthrough tube. The fabrication and assembly technique for this isolator is complex, and thus expensive. Furthermore, although the isolator element itself is small, the cylindrical magnet employed renders this isolator arrangement bulk and cumbersome.

The optical isolator arrangement of U.S. Pat. No. 4,966,444 attempts to reduce the number of components employed by utilizing a Faraday rotator as a lens. In addition to compromising the performance of the isolator, this arrangement remains bulky due to the large radius of curvature required by the Faraday rotator lens, and the large cylindrical magnet employed.

U.S. Pat. No. 5,452,122 discloses a further isolator arrangement which utilizes laminated isolator elements, and a cylindrical magnet. Due to the use of a cylindrical magnet the isolator must be rotationally aligned to the output mode of the semiconductor laser.

According to a first embodiment of the present invention, there is provided an optical isolator mountable on a planar surface, the optical isolator comprising an isolator element, having an optical axis and comprising a Faraday rotator and at least one polarizer, which may be a grafting polarizer or birefringent walk off crystal and a magnet, wherein the magnet is an open-core magnet shaped so that when placed on a substantially planar surface an orifice is defined by the magnet and the substantially planar surface, and wherein the isolator element is located within said orifice so that the said optical axis passes through said orifice. The present invention thus provides a surface mountable optical isolator by the use of an open-ore magnet The present applicants have discovered that an open-core (i.e. non cylindrical) magnet can provide sufficient magnetic flux to saturate a Faraday rotator.

Preferably, in embodiments of the present invention, the magnet is generally U-shaped in cross-section, and preferably the isolator element is a laminate comprising a plate shaped Faraday rotator bonded between plate shaped polarizers.

In embodiments of the present invention in which the edges of the orifice defined by the magnet define a rectangle, the rotational alignment of the isolator element within the magnet orifice is defined by this geometry. Since the non-cylindrical magnet is surface mountable the rotational alignment between the magnet and any source of optical radiation, for example a semiconductor laser, is also predefined by the geometry of the magnet. Thus, no rotational alignment is required in the assembly of optical isolators according to embodiments of the present invention.

According to a second aspect of the present invention there is provided an optical device comprising a source of optical radiation for generating a beam of optical radiation, an optical waveguide for receiving the beam, focusing means for focusing the beam onto the optical waveguide and an optical isolator according to the present invention, wherein the focusing means directs a converging beam of optical radiation through the isolator and onto the optical waveguide. Embodiments of the present invention thus provide a particularly compact optical isolator arrangement which utilize a converging beam of optical radiation passing through the isolator. Additionally, the use of a converging optical beam through the isolator prevents reflections from components of the optical isolator from reaching the source of optical radiation e.g. the semiconductor laser.

Preferably the focusing means comprise a single, preferably spherical lens. This focusing means is particularly simple, effective, and of low cost.

Alternatively, a third aspect of the present invention provides an optical device comprising a source of optical radiation for generating a beam of optical radiation, an optical waveguide for receiving the beam, focusing means for focusing the beam onto the optical waveguide and an optical isolator according to the present invention, wherein the focusing means directs a parallel beam of optical radiation through the isolator, and the optical axis of the isolator element is at a non-zero angle to the parallel beam. Thus, in isolator arrangements where it is desirable to provide a parallel beam of optical radiation through the isolator, the present invention provides a particularly simple and effective means to angle the optical isolator element to the parallel beam, for example to avoid reflections from components of the isolator element from reaching the source of optical radiation. Since, according to the present invention, the isolator element is within the orifice of the surface mountable magnet, the whole optical isolator may be easily angled relative to the parallel optical beam by rotating the magnet within the plane of its mounting surface. Such rotation will not affect the rotational alignment of the isolator element about its optical axis relative to the output of the source of optical radiation.

According to a fourth aspect of the present invention there is provided a semiconductor laser module comprising a package within which is mounted an optical device, which device comprises an optical isolator according to the present invention. The particularly compact optical isolators provided by the present invention, in combination with their ability to be surface mounted, allow them to be directly mounted within the package of a semiconductor laser module. This leads to a number of advantages. Packaging the optical isolator within the same package as the semiconductor laser leads to cost reductions both in component parts, and in assembly costs. Furthermore, the optical isolator benefits from the controlled environment provided within the package for the semiconductor laser. For example, many semiconductor laser modules are provided with temperature control which improves and stabilizes the performance of the semiconductor laser. Since the Faraday rotation angle of Faraday rotators varies with temperature, the performance of the optical isolator can be dramatically improved at no additional cost if its temperature is controlled due to its position within a semiconductor laser module.

Figure 2:
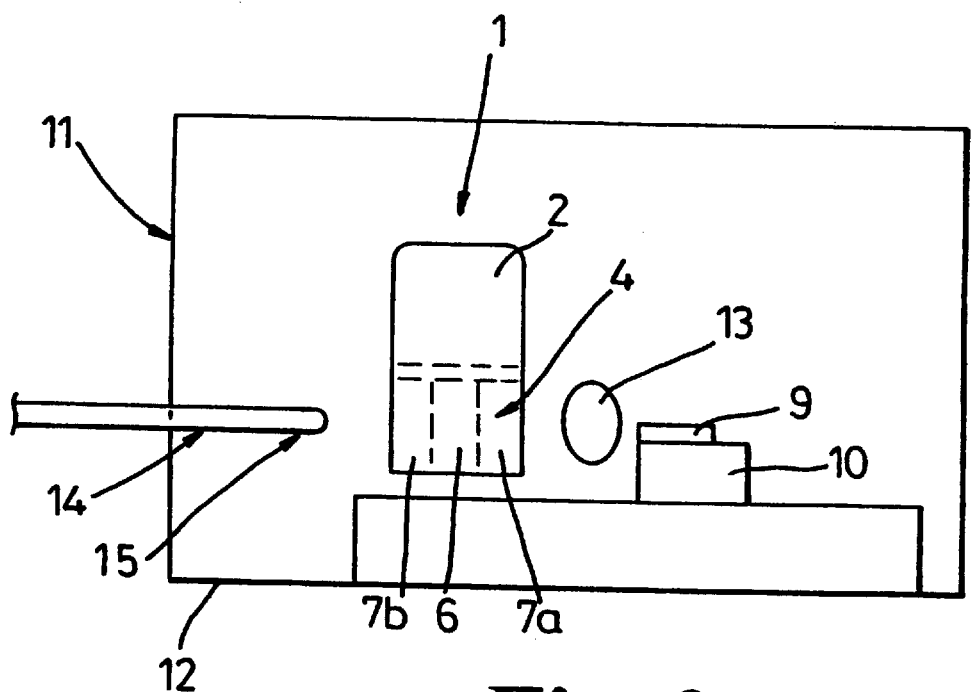
Figure 3:
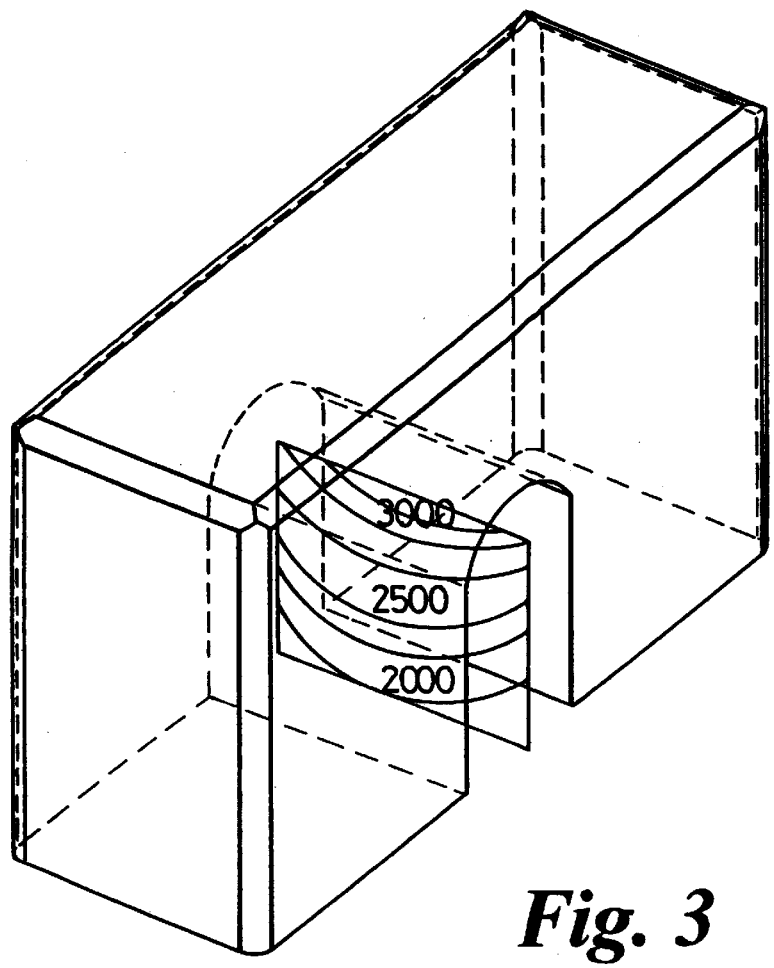
Figure 4:
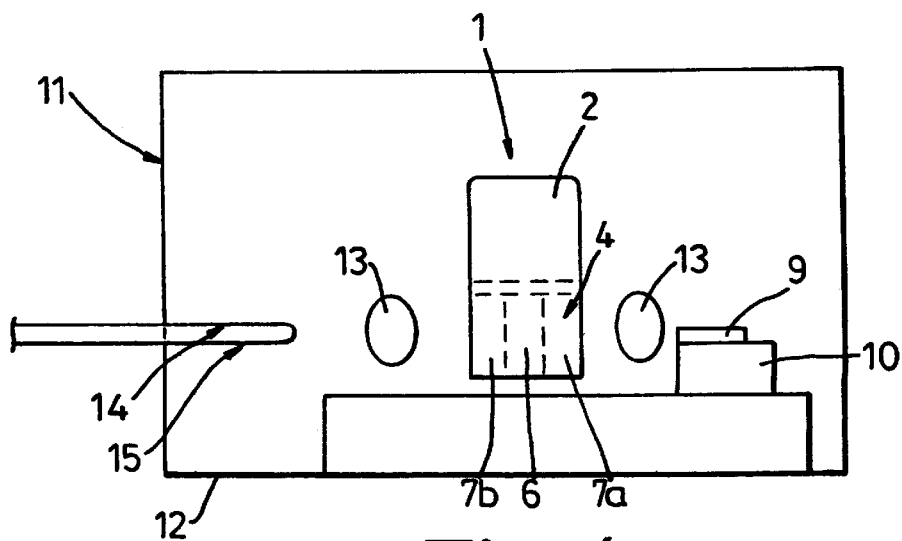

Embodiments of the present invention will now be described, by way of example only, and with reference to the accompanying drawings in which:

FIG. 1 is a schematic representation of an optical isolator according to an embodiment of the present invention, FIG. 2 is a schematic representation of a first embodiment of a semiconductor laser module according to the present invention, FIG. 3 is a schematic representation of a magnet utilized in an embodiment of the present invention, showing the results of a theoretical calculation of the magnetic field strength within the magnet, and FIG. 4 is a schematic representation of a second embodiment of a semiconductor laser module according to the present invention.

FIG. 1 is a perspective view of an optical isolator according to an embodiment of the present invention. The isolator 1 comprises a magnet 2 having a square sided orifice 3 in which is located an isolator element 4. The magnet 2 is generally U-shaped in cross-section, and comprises two mounting areas 5, which lie within the same plane, for mounting the optical isolator 1 on a planar surface. The isolator element 4 is a laminate comprising a Faraday rotator 6 sandwiched between two polarizers 7a and 7b. The isolator element 4 comprises an optical axis 8 which passes through the orifice 3 in the magnet 2. The fabrication of this laminate will be described below.

FIG. 2 shows a schematic, perspective view of a semiconductor laser module according to an embodiment of the present invention, which utilizes an optical isolator 1. A semiconductor laser 9 is mounted on a heatsink 10 within a laser package 11. Due to the geometry of the optically active element of the semiconductor laser 9, the output mode (TEoo) of the semiconductor laser is horizontally polarized with respect to the planar base 12 of the semiconductor laser package 11. Between the optical isolator 1 and the semiconductor laser 9 is a zirconia ball lens 13. The ball lens 13 has a diameter of 500 $\mu$m, and serves to collect the output light beam from the semiconductor laser 9, and to focus this light beam through the optical isolator 1 and on to a single mode optical fiber 14.

The fabrication of the isolator element 4, and the magnet 2 will now be described in greater detail.

The isolator element 4 is formed as a three-layer sandwich assembly. The central layer of the isolator element 4 is the Faraday rotator 6 which serves to rotate the plane of polarization of light. Any suitable material, such as a crystalline material, may be used for this purpose. In the preferred case the Faraday rotator 6 of the isolator element 4 is a bismuth iron garnet ("BiG") crystal wafer. The outside layers of the isolator element 4 are formed by polarizers 7a and 7b. The polarizers 7a and 7b are secured to the major surfaces of the wafer 6 by a suitable adhesive.

Although any appropriate crystal may be used, in the preferred instance the crystal 6 is derived from an LPE Garnet Film Optical isolator wafer [chemically, $(TbBi)^3 Fe_5O_{12}$], sold by the Non-Ferrous Metals Division of Sumitomo Corporation of America, New York, N.Y. The crystal 6 has a rotation angle of 45 degrees, +/−1 degree, for the centre wavelength desired. To achieve high yields in manufacture the wafer from which the crystal 6 is derived must have rotation uniformity across the entire wafer and a transmittance of greater than approximately 90%. A preferred center wavelength is 1550 nanometers, although the wavelength of 1300 nanometers is not uncommon.

To obtain a 0.01% or lower reflectivity from the isolator element 4 for the desired center wavelength the major surfaces of the crystal 6 should be covered with a three-layer, high quality anti-reflection (AR) coating. A suitable coating may be provided by KML Optical Industries, Hauppauge, N.Y. Each coating is designed to index-match the crystal 6 to the adjacent adhesive layer. The AR coatings are preferably applied by ion deposition.

Although other polarizers may be used, the preferred polarizers 7a and 7b are each formed from the material manufactured by Corning Incorporated, Corning, N.Y., and sold as Corning Code 1550 HC Polarcor™ polarizers. One of the polarizers 7b exhibits an edge angle of 45° (i.e. the plane of polarization passed by the polarizer is at 45° to the edge of the polarizer) while the edge angle of the other polarizer 7a is 0°. The, polarizers 7a and 7b are attached to the coated major surfaces of the crystal 6 by a respective layer of index-matching adhesive. Preferably, the adhesive is UV curable epoxy adhesive manufactured by Epoxy Technologies Inc. of Billerica, Mass., USA and sold as Epotek 353 ND adhesive.

The isolator element 4 is fabricated by securing the wafers of polarizer material 7a and 7b (each approximately 10×10×0.2 mm) to the major surfaces of the crystal (approximately 10×10×0.35 mm) using the adhesive. The resulting assembly is cured and thereafter diced into the isolator elements 4 used in the isolator 1. The dicing is accomplished using a diamond dicing saw with a 0.07 mm kerf blade. The resulting isolator elements 4 are approximately 0.4 mm×0.4 mm. One edge of the polarizer 7a is marked so as to distinguish polarizer 7a from polarizer 7b, and to indicate the direction of the plane of polarization passed by polarizer 7a.

The magnet 2 has a width of 2 mm, a height of 1.2 mm, and a depth of 0.7 mm. When the magnet 2 is placed on a planar surface, an orifice 3 is defined which is dimensioned so as to accept an isolator element 4 which is 0.4 mm wide and 0.4 mm high. The magnet may be formed of a number of magnetic materials, but preferably is formed of samarium cobalt, or neodymium iron boron. A solid block of magnetic material may be machined to form the magnet, or preferably due to lower costs, the magnet may be moulded from resin bonded material. In this case a typical composition would include approximately 6% resin. The magnet is magnetized subsequent to fabrication by subjecting it to a 40 KGauss magnetic field. The magnetic field within the orifice of the magnet 2 has been theoretically modeled, and FIG. 3 shows a schematic outline of the magnet 2 with a super-imposed theoretically calculated field strength for the magnetic field generated in a vertical plane within the orifice 3. From this figure it can be seen that the magnetic field strength varies from 3250 Gauss at the top of the orifice 3, to 2000 Gauss at the bottom of the orifice 3. Since the saturation field strength of the Faraday rotator 6 is 1000 Gauss, the Faraday rotator 6 will be fully saturated when placed within the orifice 3 of the magnet 2.

The isolator element 4 is then bonded within the orifice 3 of the magnet 2. The isolator element 4 is orientated so that the polarizer 7a, whose plane of polarization is parallel to an edge of the isolator element 4, is mounted within the magnet so as to face the semiconductor laser 9, and so as to pass horizontally polarized light.

With reference to FIG. 2, the assembly of the semiconductor laser module will now be described. The heatsink 10 is first mounted on the planar base 12 of the semiconductor laser package 11. This provides a surface on which the semiconductor laser 9 can be mounted which is parallel to the base 12 so that the polarization of the output mode of the semiconductor laser 9 is now accurately aligned to the base 12. Furthermore, rotational alignment of the optical isolator, about its optical axis, is simply achieved by the placing the mounting areas 5 of the optical isolator in contact with the planar base 12 of the semiconductor laser package 11. The optical isolator 1 is then mounted on the base 12. This can be achieved "passively" i.e. without activating the semiconductor laser 9, since the orifice 3 and isolator element 4 are sufficiently large. A "dummy" optical fiber 14 is then utilized to aid the accurate, active alignment of the ball lens 13 to the semiconductor laser 9. One end of the dummy fiber 14 is temporarily mounted to the laser package 11, while the other end of the dummy fiber 14 is inserted into an optical detector. The semiconductor laser 9 is electrically powered, so that it emits optical radiation, and the ball lens 13 is aligned so as to maximize the optical power coupled from the semiconductor laser 9 to the dummy optical fiber 14. Once the ball lens 13 has been fixed in place, using light curing resin, the dummy optical fiber 14 is replaced with a permanent optical fiber 14 mounted within a fiber tube. The fibre 14 is actively aligned, and the fiber tube is laser welded to the wall of the laser package 11.

In use, horizontally polarized light is emitted by the semiconductor laser 9, passes through the lens 13 and enters the isolator 1, via the polarizer 7a. The polarizer 7a passes this light with little optical loss, since its plane of polarization is horizontally aligned. The Faraday rotator 6, being within the magnetic field of the magnet 2, causes the plane of polarization of the light to be rotated through 45°. The light is then passed out of the isolator through the polarizer 7b, which because its plane of polarization is aligned at 45° to the edges of the polarizer, once again passes the light with little optical loss. Any light reflected by the end 15 of the optical fiber 14, or any other component to which the optical fiber 14 is attached, is prevented from reaching the semiconductor laser 9 by the optical isolator 1. Reflected light which is not aligned with the plane of polarization of the polarizer 7b is attenuated severely by the polarizer. Reflected light which is aligned with the plane of polarization of polarizer 7b passes through polarizer 7b with a low optical loss, and is rotated through 45° by Faraday rotator 6 so that its plane of polarization is vertical relative to the base 12 of the laser module 11. Since the plane of polarization of polarizer 7a is horizontal, this light is severely attenuated by polarizer 7a.

Any light from the semiconductor laser 9 which is, despite the AR coating applied to various surfaces, reflected from components of the isolator 1 back towards the semiconductor laser 9, is unlikely to reach the semiconductor laser 9 due to the converging nature of the light beam striking the isolator. The use of a converging beam through the optical isolator 1 is facilitated by the use of polarizers 7a and 7b which have a high optical extinction for optical beams received at large angles to the optical axis. The polarizers employed have an optical extinction grater than 30 db for optical beams received at angles of less than 10° to the optical axis.

Measurements performed on optical isolators according to the present embodiment indicate that typically isolation of 33 dB is provided, with insertion losses of 0.5 dB.

FIG. 4 shows an alternative embodiment of the present invention in which two ball lenses 13 are employed, in order to provide a parallel beam trough the optical isolator 1. It will be appreciated that a confocal arrangement of lenses may be used. The optical isolator 1 is mounted at an angle of approximately 2° to the parallel optical beam, in order to prevent any reflections from the optical isolator from reaching the semiconductor laser 9. This angling of the optical isolator is easily achieved by rotating the isolator about a vertical axis, and does not affect the alignment, about the optical axis 8, of the polarizer 7a to the plane of polarisation of the semiconductor laser.

Although embodiments of the present invention have been described in relation to semiconductor lasers, the invention also finds application with fiber lasers.

Furthermore, it will be appreciated that optical isolators according to the present invention can advantageously be utilised with opto-electronic integrated circuits (OEICs) and can be mounted on planar surfaces comprising metallic, ceramic or silicon substrates. Such substrates may be provided with location steps or v-grooves.

What is claimed is:

1. An optical isolator mountable on a planar surface, the optical isolator comprising:
   an isolator element, having an optical axis and comprising a Faraday rotator and at least one of a polarizer or birefringent walk off crystal, and
   a magnet,
   wherein the magnet is an open-core permanent magnet shaped for placement on a substantially planar surface, to define an orifice surrounded by the magnet and the substantially planar surface, said substantially planar surface being comprised of a material that does not provide a preferred flux pathway, and
   wherein for operation as an optical isolator, the isolator element is located within said orifice so that the said optical axis passes through said orifice.

2. An optical isolator as claimed in claim 1, wherein the magnet comprises two mounting areas, which lie substantially within the same plane, for mounting the magnet on the planar surface.

3. An optical isolator as claimed in claim 1, wherein the magnet is generally U-shaped in cross-section.

4. An optical isolator as claimed in claim 1, wherein the magnetic flux generated by the magnet within said orifice is substantially parallel to the optical axis of the isolator element.

5. An optical isolator as claimed in claim 1 wherein edges of said orifice define a rectangle.

6. An optical isolator as claimed in claim 5, wherein the edges of said orifice substantially define a square.

7. An optical isolator as claimed in claim 1, wherein the isolator element is a laminate comprising a Faraday rotator, which is plate shaped and bonded between plate-shaped polarisors.

8. An optical device comprising:

a source of optical radiation for generating a beam of optical radiation, an optical waveguide for receiving the beam, focusing means for focusing the beam onto the optical waveguide, and an optical isolator including an isolator element, having an optical axis and comprising a Faraday rotator and at least one of a polarizer or birefringent walk off crystal, and an open-core permanent magnet shaped for placement on a substantially planar surface, to define an orifice surrounded by the magnet and the substantially planar surface, said substantially planar surface being comprised of a material that does not provide a preferred flux pathway, and wherein for operation as an optical isolator, the isolator element is located within said orifice so that the said optical axis passes through said orifice, wherein the focusing means directs a converging beam of optical radiation through the isolator and onto the optical waveguide.

9. An optical device is claimed in claim 8, wherein the focusing means comprises a single lens.

10. An optical device as claimed in claim 8, wherein each polarizer of the optical isolator has a high optical extinction for optical beams received at a large angle to the optical axis.

11. An optical device as claimed in claim 10, wherein each polarizer has an optical extinction greater than 30 dB for optical beams received at less than 10° to the optical axis.

12. An optical device as claimed in 8, wherein each polarizer is of the grating type.

13. An optical device comprising:

a source of optical radiation for generating a beam of optical radiation, an optical waveguide for receiving the beam, focusing means for focusing the beam onto the optical waveguide, and an optical isolator including an isolator element, having an optical axis and comprising a Faraday rotator and at least one of a polarizer or birefringent walk off crystal, and an open-core permanent magnet shaped for placement on a substantially planar surface, to define an orifice surrounded by the magnet and the substantially planar surface, said substantially planar surface being comprised of a material that does not provide a preferred flux pathway, and wherein for operation as an optical isolator the isolator element is located within said orifice so that the said optical axis passes through said orifice, wherein the focusing means directs a parallel beam of optical radiation through the isolator, and the optical axis of the isolator element is at a non-zero angle to the parallel beam.

14. An optical device as claimed in claim 13, wherein the focusing means comprise two confocal lenses.

15. An optical device as claimed in claim 8, wherein the optical waveguide is an optical fiber.

16. An optical device as claimed in claim 8, wherein the optical waveguide is a planar optical waveguide.

17. An optical device as claimed in claim 8, wherein the source of optical radiation is a semiconductor laser.

18. An optical device as claimed in claim 8 wherein the source of optical radiation is a fiber laser.

19. A semiconductor laser module comprising a package within which is mounted an optical device according to claim 8.

* * * * *